July 15, 1941.   T. R. ELLIOTT   2,249,695
TIRE PROTECTOR
Filed June 21, 1940
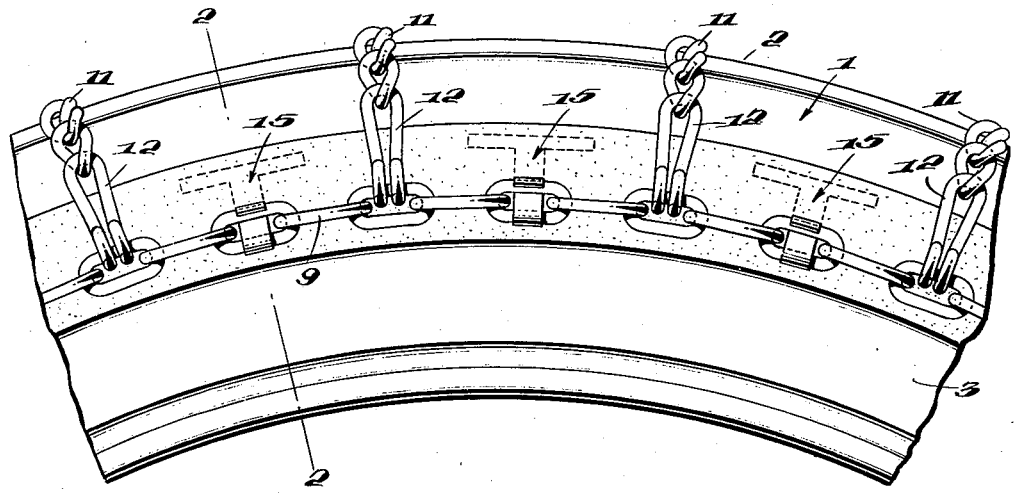
Fig. 1.
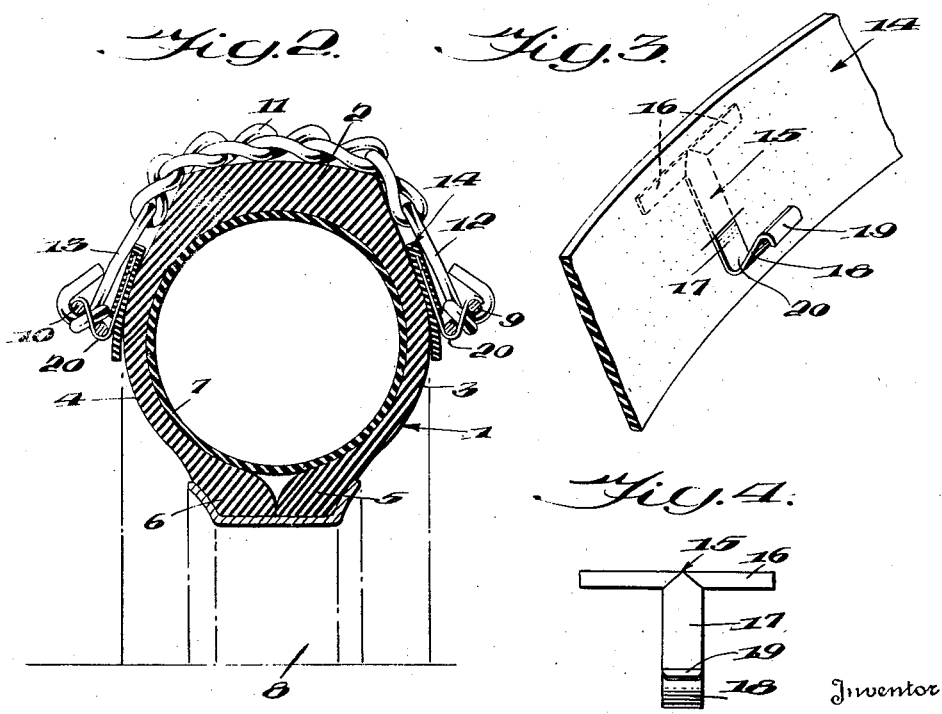
Fig. 2.   Fig. 3.
Fig. 4.
Inventor:-
Thomas R. Elliott,
By Smith, Michael & Gardiner,
Attorneys.

Patented July 15, 1941

2,249,695

UNITED STATES PATENT OFFICE 2,249,695

TIRE PROTECTOR

Thomas Raymond Elliott, Wilmington, Del.; Mary Elizabeth Dyer administratrix of said Thomas R. Elliott, deceased Application June 21, 1940, Serial No. 341,752

6 Claims. (Cl. 152—239)

This invention relates to a tire protector, and has particular reference to a protector adapted to be interposed between the tire casing and an anti-skid chain mounted on said casing, whereby the chain is maintained in correct position on the casing and the casing is protected from rubbing, chafing or other injury by the said anti-skid chain.

It is a recognized fact that an anti-skid chain which is mounted on the tire of a land vehicle such as an automobile, truck or the like, is quite injurious to the tire casing. The conventional anti-skid chains usually employed comprise a pair of circumferentially-extending side chains positioned adjacent the side wall portions of the tire casing and connected at spaced intervals by transverse chains which overlie the tread surface of the casing. These anti-skid chains are mounted on the casing to prevent skidding and to increase traction, and are usually so proportioned with respect to the casings, that there is considerable relative movement between the casings and chains as the vehicle equipped with such casings and chains proceed along a highway. This relative movement causes the chains to rub or chafe the casings and this rubbing or chafing is especially noticeable along the side wall portions of the casings. Hence the side walls of the casings soon become rough and unsightly due to the rubbing or chafing of the said side walls by the circumferentially-extending side chains and the adjacent terminal links of the several cross-chains. Such a rough and unsightly condition of the side walls is objectionable, and is especially objectionable in connection with the tire casings having white side walls.

It is an object of this invention to provide a protective strip adapted to be interposed between a tire casing and an anti-skid chain mounted thereon to protect the said casing from injury by said tire chain.

It is an object of this invention to provide a protective strip adopted to be interposed between a tire casing and an anti-skid chain mounted thereon, and to associate with said strip novel fastening means adapted to engage portions of the anti-skid chain to hold said chain in proper position on the casing and to protect said casing from rubbing or chafing by the said anti-skid chain.

It is an object of this invention to provide an annular protective strip of a diameter and radial width corresponding to the approximate diameter and radial width of the side wall portions of the tire casing to which said strip is to be applied, and which strip is adapted to be interposed between one of the side wall portions of the tire casing and one of the circumferentially extending tire chains of an anti-skid chain mounted on said casing, whereby said strip will underlie the said circumferentially-extending side chain and the adjacent terminal links of the transverse or cross-chains connected to said side chain to thus prevent said side chain and terminal links from rubbing and chafing or otherwise injuring the underlying side wall portion of the chafing.

It is a further object of this invention to provide a protective strip of the character above referred to having spaced fastening members mounted thereon and adapted to engage spaced links on one of the circumferentially-extending side chains of the anti-skid chain mounted on the tire casing, to properly position the chain on the casing and to protect the tire casing from injury by said anti-skid chain.

It is a still further object of this invention to provide a tire protector of the character above referred to which is cheap and easy to manufacture, simple in construction and operation, strong and durable, and highly efficient in the purposes for which designed.

In the accompanying drawing wherein for the purpose of illustration there is shown a preferred embodiment of the present invention:

Figure 1 is a fragmentary side elevation of a tire casing of any desired or preferred construction showing an anti-skid chain mounted thereon and showing the protective strip of the present invention disposed between the casing and the anti-skid chain;

Fig. 2 is a transverse sectional view on the lines 2—2 of Fig. 1;

Fig. 3 is a fragmentary enlarged perspective view of a segment of the protective strip of the present invention, and Fig. 4 is a plan view of one of the fasteners to be mounted on or connected to the protective strip of the present invention.

Referring in detail to the accompanying drawing, wherein like reference numerals are employed to designate like parts throughout the several views, the numeral 1 designates broadly a tire casing of any desired or preferred construction. While I have illustrated and described the present invention as applied to a conventional pneumatic tire of the type commonly used on automobiles, trucks or the like, it is to be understood that the protective strip disclosed and claimed herein may be used in connection with any type of solid or pneumatic tire casing. The tire illustrated in the accompanying drawing comprises a shoe or casing having a tread surface 2, side wall portions 3 and 4 and beads 5 and 6, this shoe or casing enclosing the usual inflatable inner tube 7, with the beads 5 and 6 of the casing mounted in a conventional rim 8. All of the above described construction is old and well known in the prior art and forms no part of my present invention.

The anti-skid chain which I have elected to illustrate and describe in connection with the present invention comprises two circumferentially-extending side chains 9 and 10, each composed of a plurality of similar connected individual links, the diameter of each of these two side chains being such that when the chain is applied to the tire casing, each of the side chains 9 and 10 will be disposed adjacent the approximate mid-sections of the side wall portions 3 and 4, respectively, of the tire casing, as clearly illustrated in Figs. 1 and 2 of the accompanying drawing. The circumferentially-extending side chains 9 and 10 are connected by the usual spaced, transverse or cross-chains 11 which overlie the tread surface 2 of the tire casing at spaced intervals around the circumference thereof. Each of these transverse or cross-chains 11 is composed of a plurality of similar connected individual links, and includes terminal links 12 and 13 which are connected to spaced links of the two side chains 9 and 10, respectively. The side chains 9 and 10 are provided with suitable connecting fasteners (not shown) which function in a well known manner to permit the anti-skid chain to be applied to and removed from the tire casing. The particular anti-skid chain illustrated and described herein is old and well known in the art and forms no part of my present invention, this type of chain having been selected for illustrative purposes only and with the understanding that the present invention is not restricted to use with this particular type of chain. In other words, the present invention is susceptible of use with any type of anti-skid chain which includes a circumferentially-extending side member or members adapted to overlie the side wall portion or portions of a tire casing and having suitable anti-skid or traction-increasing portions connected thereto and extending over all or a portion of the tread surface of the tire casing.

As a means for carrying out the aforestated objects of the present invention, I provide a protective strip 14 preferably composed of a relatively thin strip of rubber, cloth, metal or any other material suitable for the purpose. This strip 14 is moulded, cut or otherwise formed to have an annular shape or configuration and is of a diameter and radial width corresponding to the approximate diameter and radial width of the side wall portions of the tire casing with which the protective strip is to be used. To facilitate attachment of the strips to the anti-skid chains and to permit one of said strips to be attached to the inner surface of a tire when said tire and its supporting wheel are attached to a vehicle, said strips may be radially split and coacting, separable fasteners of any suitable character may be provided on the outer face of the strip adjacent said radial split, which fastening means, when fastened, serve to retain the strip in annular form after the strip has been attached to the anti-skid chain and said chain mounted on the tire casing. The protective strips of the present invention are made in various diameters in order to adapt them for use with tire casings of different sizes. It is the common or conventional practice in the manufacture and sale of anti-skid chains to provide chains in which the diameters of the circumferentially-extending side chains and the lengths of the transverse or cross-chains vary in accordance with standard tire sizes, the relation between the size of the casing and the size of the chains being such that the circumferentially-extending side chains usually overlie the mid-sections of the side wall portions of the casing. Assuming that the proper diameter protective strip and the proper diameter anti-skid chain have been selected for a particular size tire casing, it will be obvious from the above that when the selected protective strip 14 and the selected anti-skid chain have been mounted on said tire casing, the said strip may be disposed between one of the circumferentially-extending side chains and the mid-section of the side wall of the tire casing, as illustrated in Figs. 1 and 2 of the accompanying drawing.

The protective strip 14 is provided at spaced intervals along the outer face thereof with suitable fastening means 15 for detachably connecting this strip to one of the circumferentially-extending side chains 9 or 10 of the anti-skid chain, the spacing of these fastening means 15 with respect to the transverse or cross-chains 11, being such that they will detachably engage links of the side chain intermediate the links to which said transverse or cross-chains 11 are connected. As a preferred form of fastening means I provide a substantially T-shaped member, preferably stamped or cut from spring steel or other suitable metal and including a laterally extending head portion 16, a body portion 17 and an upturned portion 18 which terminates in a forwardly disposed hook-like portion 19. The head portion 16 and/or the body portion 17 of the fastening member 15 is secured to the outer face of the strip 14 by any suitable means, for example, in instances where the said strip is moulded of rubber or other suitable mouldable material, the said head portion and/or body portion may be mounted in the strip during the moulding thereof. In instances where the said strip is made of cloth or other unmouldable material, the head portion 16 and/or the body portion 17 of the fastener 15 may be secured to said strip by means of rivets or other suitable fastening means. The length of the up-turned portion 18 of the fastener 15 is such that the distance between the upper surface of the curved portion 20 and the under surface of the hook-like portion 19 is slightly less than the overall thickness of the similar connected, individual links constituting the side chains 9 or 10. A sufficient number of these fastening means 15 are mounted on the strip 14 to serve as means for effectively securing the strip and the anti-skid chain together, it being noted that such fastening means are so positioned that they will engage a link intermediate the links of the side chains to which the transverse or cross-chains 11 are connected.

When the protective strip of this invention is to be used, the said strip is detachably connected to an anti-skid chain of corresponding size by placing one side of spaced links of the side chains 9 or 10 on the upper surfaces of the curved portions 20 of each of the spaced fasteners 15, the opposite sides of each of said links being forced beneath the under surfaces of the hook-like portions 19 of the fasteners, as clearly illustrated in Figs. 1 and 2. Due to the fact that the fasteners 15 are made of spring steel or other suitable metal and that the distance between the upper surface of the portions 20 and the under surface of the portions 19 of each fastener is slightly less than the overall thickness of the links of the side chains 9 and 10, the said fasteners 15 serve admirably as a means for detachably connecting the protective strip to the anti-skid chain, it being obvious that when it is desired to disconnect the strip from the chain, a sufficient pressure is brought to bear on the links to "snap" the upper portions thereof from beneath the hook-like portions 19 of the fasteners 15. The laterally-extending portions 16 of the fasteners 15 provide an effective means for securing the individual fasteners to the strip and, due to the extended length of the portions 16 of each fastener 15, said portions serve to hold the outer edge of the protective strip in place, i. e., the portions 16 of the plurality of fasteners mounted on the strip prevent the outer edge of the strip from curling or turning inwardly. Further, the portion 16 of each fastener is of a sufficient length to bear against the adjacent side wall of the casing to effectively prevent the fastener from turning. One of the protective strips of the present invention may be attached to each of the two circumferentially-extending side chains 9 and 10 as illustrated in Fig. 2 of the accompanying drawing, or, if desired, such a strip may be employed only in connection with the chain which is located adjacent the outer side wall of the tire casing. The protective strip can be connected to the anti-skid chain prior to the mounting of said chain on the tire casing or, if desired, the antiskid chain may be mounted on the casing and the protective strip subsequently attached to one of the side chains 9 or 10, it being understood that regardless of when the strip and chain are detachably connected, the said strip will always occupy a position between the casing and the circumferentially-extending chain to which said strip is connected.

It will thus be seen that I have provided a strip suitable for ready attachment to the circumferentially-extending members of an antiskid chain, which strip is interposed between the tire casing and said member, and which strip serves to maintain the anti-skid chain in correct position on the casing and to protect the casing from rubbing, chafing or other injury by said anti-skid chain. I have further provided a novel fastening means for detachably connecting the strip to the anti-skid chain, which fastening means functions to retain the strip in proper contact with the adjacent side wall of the casing and to maintain the anti-skid chain in proper position on the casing. For practical purposes, the average radial width of the strip is of the order of two inches and said strip may, if desired, be made of various colors to suit the tastes of the manufacturer or purchaser. For example, if the strip is used with white side wall tires, said strip may be made of white rubber or other white material. The use of the protective strip of the present invention is particularly desirable in connection with "low pressure" tires where the friction between the side walls of the tire and the anti-skid chain is considerably greater than that between the side walls of a "high pressure" tire and its associated skid-chain. The protective strip of the present invention may be made of flexible material such as rubber or the like whereby such a strip will contract to compensate for slight variations in the relative diameters of the side chains and tire casing due to the decrease in tire diameter caused by a wearing away of the tread surface. The particular fastening means above described for connecting the strip to the anti-skid chain permits the ready attachment and detachment of the two members but is sufficiently effective as not to permit the same to become detached from the strip when the chain contacts a curb or other obstruction or when the vehicle is operating in deep snow, sand, mud or the like. Another special advantage of the present device is that it permits the anti-skid chain to be reversed, thus increasing the effective and useful life of the chain.

It is to be understood that the form of my invention herein shown and described is to be taken as a preferred embodiment of the same and that various changes may be made in the shape, size, materials and arrangement of parts without departing from the spirit of my invention or the scope of the subjoined claims.

Having thus described my invention, I claim:

1. A tire protector comprising an annular strip of material interposed between the side wall of the tire casing and the entire length of one of the circumferentially-extending side chain of an anti-skid chain mounted on said tire casing to protect the side wall of said casing from contact with said circumferentially-extending side chain, and means on said strip for detachably connecting said strip to spaced links of said circumferentially-extending side chain.

2. A tire protector comprising a strip of material interposed between the tire casing and the entire length of one of the circumferentially-extending side chains of an anti-skid chain mounted on said casing to protect said casing from contact with said circumferentially-extending side, said anti-skid chain comprising a pair of circumferentially-extending side chains positioned adjacent the side wall portions of said casing and a plurality of spaced cross chains connecting said circumferentially-extending side chains and extending across the tread surface of said tire casing, and means secured to the strip between said cross chains and engaging portions of one of the circumferentially-extending side chains for detachably connecting said strip to said circumferentially-extending side chain.

3. A tire protector comprising a strip of material interposed between the tire casing and an anti-skid chain mounted on said casing to protect said casing from contact with said antiskid chain, said anti-skid chain including a plurality of spaced cross chains connected to a pair of circumferentially-extending side chains and means for attaching said strip to one of said circumferentially-extending side chains, said means comprising a plurality of fasteners connected to the strip and each including a body portion disposed transversely of the strip, lateral portions extending from the body portion and longitudinally of the strip, and a hook-like portion at the end of the body portion which engages the said circumferentially-extending side chain.

4. A tire protector comprising a strip of material interposed between the tire casing and an anti-skid chain mounted on said casing to protect said casing from contact with said antiskid chain, said anti-skid chain including a plurality of spaced cross chains connected to a pair of circumferentially-extending side chains, and a plurality of substantially T-shaped fasteners connected to the strip and each having its body portion disposed transversely of the strip with the laterally-extending portions at the top of the body portion disposed longitudinally of the strip adjacent the top edge thereof, and a hook-like member at the lower end of the body portion adapted to engage one of the circumferentially-extending side chains to attach said strip to said side chain.

5. A tire protector comprising a strip of material interposed between the tire casing and an anti-skid chain mounted on said casing to protect said casing from contact with said anti-skid chain, said anti-skid chain including a plurality of spaced cross chains connected to a pair of circumferentially-extending side chains and a plurality of substantially T-shaped fasteners connected to the strip and each having its body portion disposed transversely of the strip with the laterally-extending portions at the top of the body portion disposed longitudinally of the strip adjacent the top edge thereof, the lower end of said body portion being disposed adjacent the lower edge of the strip and being bent to provide a hook-like portion adapted to engage an adjacent link of one of the circumferentially-extending side chains to attach said strip to said side chain.

6. A tire protector comprising a strip of moldable material interposed between the tire casing and an anti-skid chain mounted on said casing to protect said casing from contact with said anti-skid chain, said anti-skid chain including a plurality of spaced cross chains connected to a pair of circumferentially-extending side chains and a plurality of fasteners connected to the strip and disposed at spaced intervals throughout the length of the strip and each including a body portion molded into the strip during the molding thereof and each having a hook-like portion extending from the body portion and adapted to engage one of said circumferentially-extending side chains of the anti-skid chain to attach said strip to said side chain.

THOMAS RAYMOND ELLIOTT.